No. 719,660. PATENTED FEB. 3, 1903.
H. HALSEY.
ELECTRIC BATTERY.
APPLICATION FILED APR. 18, 1902.
NO MODEL.
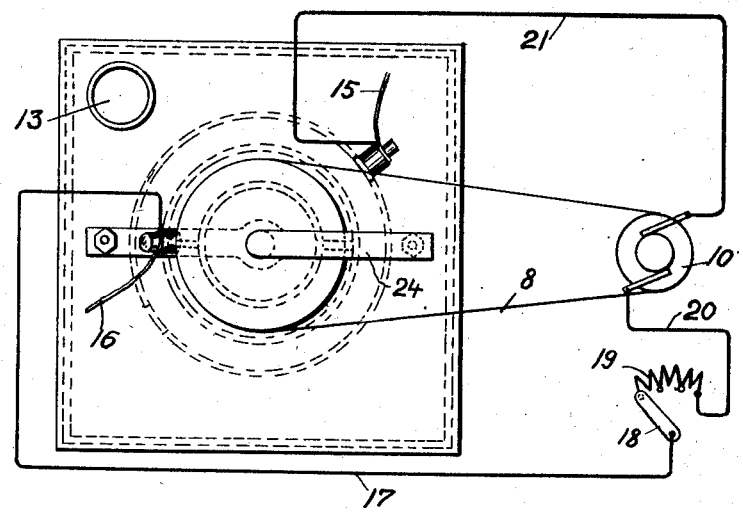
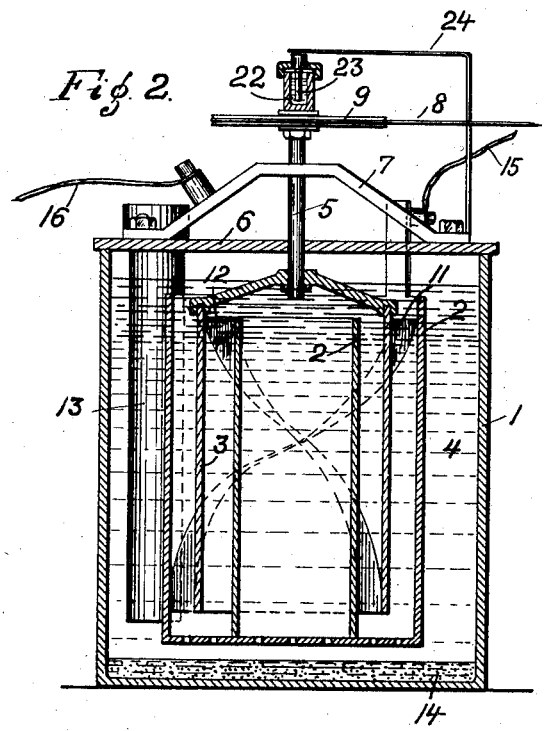
WITNESSES:
Robert H. Ireland
Lester C. Taylor
INVENTOR
Henry Halsey
BY
C. W. Edwards
ATTORNEY.

UNITED STATES PATENT OFFICE.

HENRY HALSEY, OF NEW YORK, N. Y., ASSIGNOR, BY MESNE ASSIGNMENTS, TO HALSEY ELECTRIC GENERATOR COMPANY, OF JERSEY CITY, NEW JERSEY, A CORPORATION OF NEW JERSEY.

ELECTRIC BATTERY.

SPECIFICATION forming part of Letters Patent No. 719,660, dated February 3, 1903.

Application filed April 18, 1902. Serial No. 103,642. (No model.)

*To all whom it may concern:*

Be it known that I, HENRY HALSEY, a citizen of the United States, residing at New York city, in the county of New York and State of New York, have invented certain new and useful Improvements in Electric Batteries, of which the following is a full, clear, and exact specification.

This invention relates to batteries; and its object is to provide simple and efficient means for controlling the output of a battery and for maintaining the output constant.

In carrying out the invention I provide in a battery means for maintaining movement of one or more of the elements of the battery or for moving the electrolyte, and inasmuch as the output of a battery will vary proportionately to the difference in speed between the element and the electrolyte I provide means for varying the speed of the element. In order to keep the electrolyte clean, and thereby permit efficient electrical action between the electrolyte and the elements of the battery, I provide means for collecting such precipitates as may be formed in the battery. To insure efficient action of the collecting means, I also provide means for bringing said precipitates into contact with the collecting means.

The invention will be described more in detail with reference to the accompanying drawings, in which—

Figure 1 is a top view of a battery embodying my invention, and Fig. 2 is a sectional view of the said battery.

In the drawings, 1 is a battery-cell. 2 and 3 are the respective elements or electrodes, and 4 is the electrolyte. Means are provided for moving one of the elements or the electrolyte, whereby the elements are brushed by the electrolyte and kept clean. In the construction shown in the drawings means are provided for moving both the electrolyte and one of the elements. The movable element 3 is mounted upon a shaft 5, which is suitably mounted in the cover 6, passing through the metallic bridge 7, which serves as a bearing of the shaft. Shaft 6 is rotated in the present instance by a band 8, passing around the pulley 9 upon shaft 6 and driven by a motor 10. The motor may be driven by any suitable power and from any source. Motor 10 is an electric motor and is driven by a current from the battery. The revolving element 3 carries one or more brushes 11 12, of suitable material—such, for example, as soft rubber—which brush against the stationary elements 2. These brushes may be of any suitable form and arranged in any convenient manner to brush the electrodes or move the electrolyte between the electrodes. In the drawings the brushes are shown arranged upon the element in spiral form in order that as the element is revolved the brushes will not only give the electrolyte a circular movement between the elements, but also a downward movement. A tube 13, of porous material, closed at the bottom and open at the top, is supported by the cover 6 and projects down into the electrolyte. In the tube is placed any suitable chemical depolarizing agent, such as bichromate of potassium, which will feed into the electrolyte as needed. In the bottom of the cell is a body of pitch 14, oil of greater specific gravity than the electrolyte, or other material capable of withstanding attack from the electrolyte and of receiving and holding such solid matter in the electrolyte as may be forced into contact with it.

15 and 16 represent conductors from the electrodes of the battery, and as the motor in this instance is driven from the battery the conductor 17 leads from one electrode of the battery to the controller-handle 18, which contacts with the rheostat 19, from which conductor 20 leads to the motor. From motor 10 the conductor 21 leads the battery. A simple form of connection between the movable element and the conductor 16 is that shown, in which a cup containing mercury 22 is formed in the upper end of shaft 5, and a pin 23, carried by a support 24, projects into the mercury. Support 24 is of conducting material and is connected to the bridge 7, to which conductor 16 is connected.

The mode of operation of the battery above described is as follows: The initial output of the battery is always sufficient to start the motor, and thus revolve the movable element. If the element remain stationary, the output of the battery will at first be at maximum, but as polarization increases the output will proportionately decrease; but as the initial current from the battery starts the revolution of the element or electrolyte the output of the battery will remain at maximum if the speed of the element or electrolyte be also maintained at its maximum, which speed will of course in all cases be determined according to the nature of the electrolyte or elements employed, the proportions of the parts of the battery, and other working conditions. The depolarizing of the elements may be facilitated by employing a chemical depolarizing agent, such as bichromate of potassium, in the porous tube 13, which depolarizing agent feeds into the electrolyte as needed. Such solid particles in the form of precipitates as may be formed during the action of the battery are not allowed to clog the electrolyte or permit the formation of local circuits, for the reason that such as are heavy enough to fall to the bottom of the cell are caught and absorbed by the pitch 14. They are also covered with insulating material—i. e., the pitch or oil is thus rendered harmless. The spiral brushes 11 12 give a downward direction to the flow of the electrolyte, and thus cause it to bear the lighter precipitates against and in contact with pitch 14, where the precipitates are absorbed and insulated, as before described.

Having thus described my invention, I declare that what I claim as new, and desire to secure by Letters Patent, is—

1. In a battery, the combination with the electrolyte and the elements, of means for maintaining movement of one of said elements, and means for freeing the electrolyte from precipitates, substantially as described.

2. In a battery, the combination with the electrolyte and the elements, of means for moving one of said elements, means for freeing the electrolyte from precipitates and means whereby movement of said element will brush the other element, substantially as described.

3. In a battery, the combination with the electrolyte and the elements, of means for moving one of said elements, and a brush carried by said element contacting with the other element, substantially as described.

4. In a battery, the combination with the electrolyte and the elements, of means for moving one of said elements, means for freeing the electrolyte from precipitates, and means for varying the rate of movement of said element, substantially as described.

5. In a battery, the combination with the electrolyte, of a plurality of concentrically-arranged elements, means for rotating one of said elements and a spiral brush carried by said element, substantially as and for the purpose described.

6. In a battery, the combination with the electrolyte, of a plurality of concentrically-arranged elements, a spiral brush carried by one of said elements and contacting with the other element, and means for rotating said element, substantially as described.

7. In a battery, the combination with the electrolyte and the elements, of means for mechanically freeing the electrolyte from precipitates, substantially as described.

8. In a battery, the combination with the electrolyte and the elements, of means for mechanically collecting precipitates formed in the electrolyte, substantially as described.

9. In a battery, the combination with the electrolyte and the elements, of means for insulating precipitates formed in the electrolyte, substantially as described.

10. In a battery, the combination with the electrolyte and the elements, of means for collecting and insulating precipitates formed in the electrolyte, substantially as described.

11. In a battery, the combination with the electrolyte and the elements, of a collector, a means for moving precipitates into said collector, substantially as described.

12. In a battery, the combination with the electrolyte and the elements, of collecting and insulating means and means for establishing a flow of the electrolyte against said means, substantially as described.

13. In a battery, the combination with the electrolyte and the elements, of a mass of adhesive material located in the bottom of the cell, substantially as described.

14. In a battery, the combination with the electrolyte and the elements, of a mass of adhesive and insulating material located at the bottom of the cell, substantially as described.

15. In a battery, the combination with the electrolyte and the elements, of a mass of adhesive and insulated material located at the bottom of the cell, and means for establishing a flow of the electrolyte against said adhesive material, substantially as described.

16. In a battery, the combination with the electrolyte and the elements, of a mass of insulated material located at the bottom of the cell, and means for establishing a flow of the electrolyte against said insulated material, substantially as described.

17. In a battery, the combination of an element, a vertically-mounted shaft upon which said element is carried, a cup formed in the upper end of said shaft, a body of fluid-conducting material in said cup, and a stationary contact projecting into said material, substantially as described.

18. In a battery, the combination with the electrolyte and the elements, of a vertical shaft upon which is mounted one of said elements, a spiral brush carried by said element, and means for rotating said shaft, substantially as described.

19. In a battery, the combination of means for depolarizing the elements, and means for mechanically freeing the electrolyte from precipitates, substantially as described.

20. In a battery, the combination with the electrolyte and the elements, of means for depolarizing the elements, and means for maintaining the electrolyte free from precipitates, substantially as described.

In testimony whereof I affix my signature in presence of two witnesses.

HENRY HALSEY.

Witnesses:
 HENRY BEST,
 C. V. EDWARDS.